United States Patent
Kurosawa et al.

(10) Patent No.: US 6,751,779 B1
(45) Date of Patent: Jun. 15, 2004

(54) APPARATUS AND METHOD FOR PROCESSING DOCUMENT IMAGE

(75) Inventors: Yoshiaki Kurosawa, Zama (JP); Katsumi Kato, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/531,013

(22) Filed: Mar. 20, 2000

(30) Foreign Application Priority Data

Sep. 27, 1999 (JP) .......................................... 11-273221

(51) Int. Cl.[7] .............................................. G06F 17/21
(52) U.S. Cl. ...................................... 715/520; 715/517
(58) Field of Search ................................ 715/520, 526, 715/530, 517, 515; 382/199, 305, 309, 190

(56) References Cited

U.S. PATENT DOCUMENTS

| | | | | |
|---|---|---|---|---|
| 5,018,083 A | * | 5/1991 | Watanabe et al. ........... | 715/517 |
| 5,031,121 A | * | 7/1991 | Iwai et al. .................. | 715/515 |
| 5,241,674 A | * | 8/1993 | Kuorsawa et al. ............ | 707/6 |
| 5,522,022 A | * | 5/1996 | Rao et al. ................... | 345/440 |
| 5,555,362 A | * | 9/1996 | Yamashita et al. .......... | 715/517 |
| 5,659,639 A | * | 8/1997 | Mahoney et al. ........... | 382/309 |
| 5,999,664 A | * | 12/1999 | Mahoney et al. ........... | 382/305 |
| 6,324,554 B1 | * | 11/2001 | Watanabe et al. ........... | 715/517 |
| 6,327,387 B1 | * | 12/2001 | Naoi et al. .................. | 382/190 |
| 6,466,954 B1 | * | 10/2002 | Kurosawa et al. .......... | 715/520 |
| 6,562,077 B2 | * | 5/2003 | Bobrow et al. ............. | 715/517 |
| 6,577,763 B2 | * | 6/2003 | Fujimoto et al. ........... | 382/199 |

FOREIGN PATENT DOCUMENTS

| | | |
|---|---|---|
| JP | 63-197266 | 8/1988 |
| JP | 3-122773 | 5/1991 |
| JP | 7-85298 | 3/1995 |

* cited by examiner

*Primary Examiner*—Sanjiv Shah
(74) *Attorney, Agent, or Firm*—Finnegan, Henderson, Farabow, Garrett & Dunner, L.L.P.

(57) ABSTRACT

In a document image processing apparatus, a document image is inputted as image data from an image inputting section. In a layout analyzing section, the layout of the document image is analyzed on the basis of the image data to obtain layout constituents. In an image processing section, the document image is processed. The image processing section includes an editor for specifying a position to be edited in the document image and editing the document image, on the basis of position/size data on the layout constituents, in accordance with the operator's instructions from the operation data inputting section. In an image displaying section, the document image is displayed in cooperation with the image processing section.

15 Claims, 11 Drawing Sheets

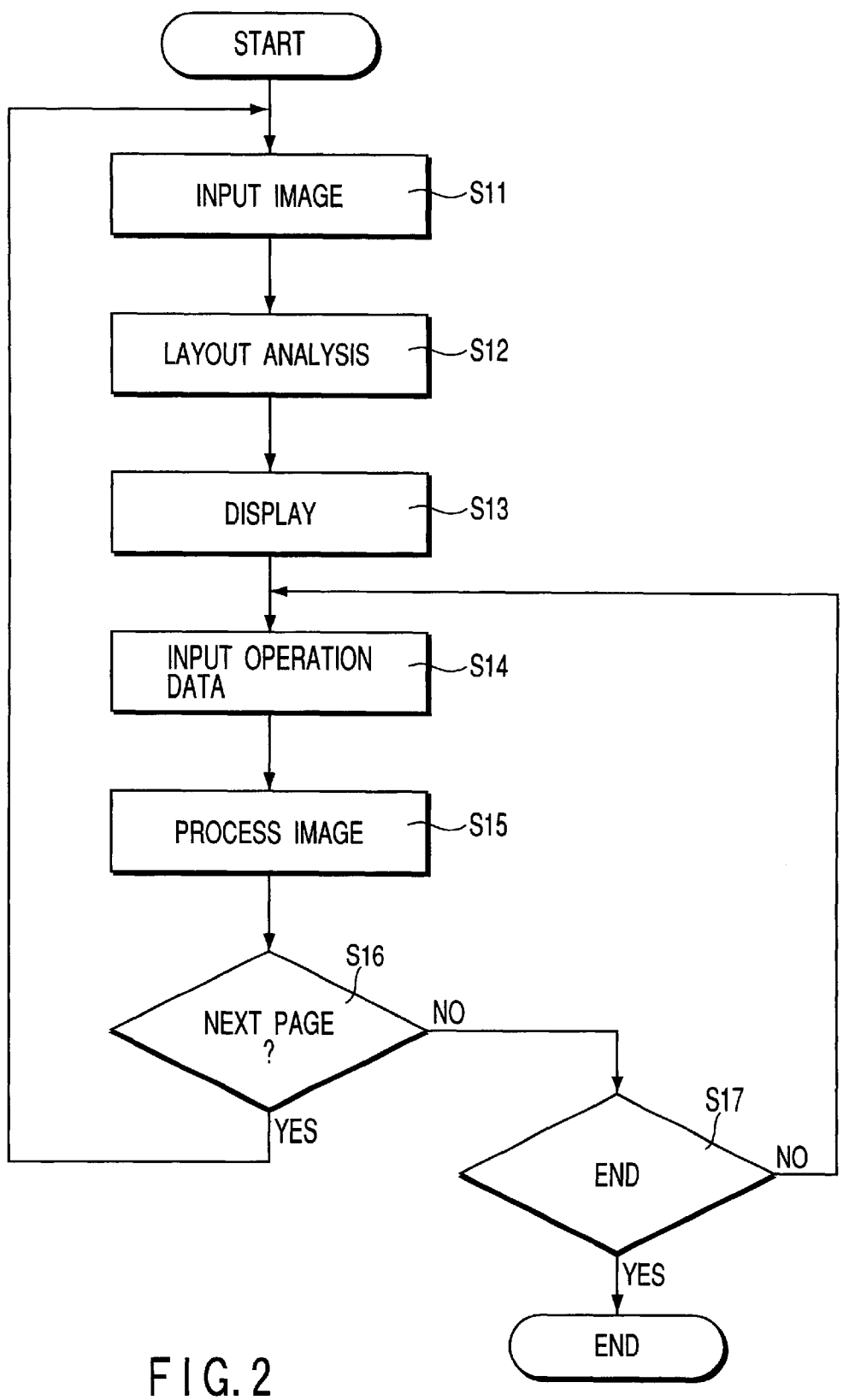
F I G. 2

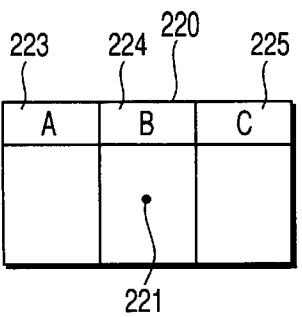
FIG. 11A
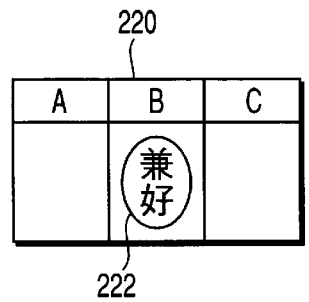
FIG. 11B
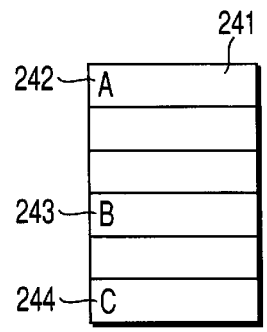
FIG. 12A
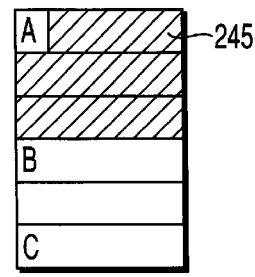
FIG. 12B
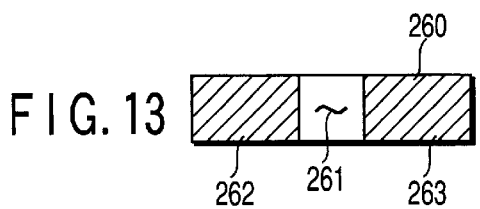
FIG. 13
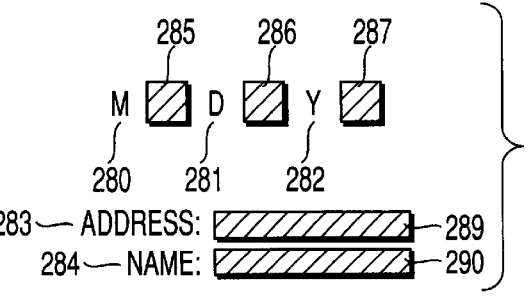
FIG. 14
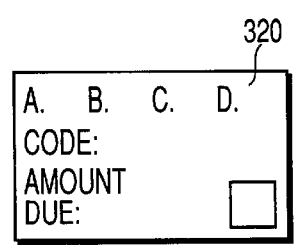
FIG. 15
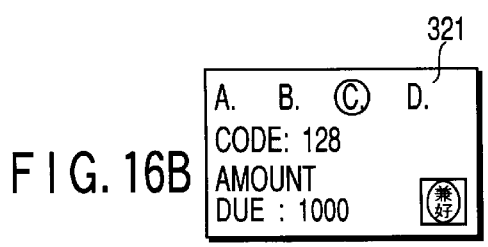
FIG. 16A
FIG. 16B
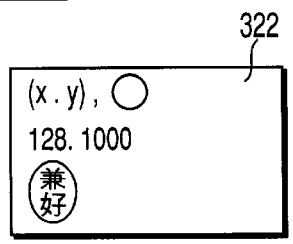
FIG. 16C

APPARATUS AND METHOD FOR PROCESSING DOCUMENT IMAGE

CROSS-REFERENCE TO RELATED APPLICATIONS

This application is based upon and claims the benefit of priority from the prior Japanese Patent Application No. 11-273221, filed Sep. 27, 1999, the entire contents of which are incorporated herein by reference.

BACKGROUND OF THE INVENTION

The present invention relates to an apparatus and method for processing a document image, each having a function of processing the contents of a document image inputted as image data. The present invention also relates to an apparatus and method for processing a document image, each making it possible to apply at least insertion or correction to a document image read by, for example, a scanner.

A technique of displaying a document image read from a book by a scanner or the like, on the screen of a computer, and correcting the image is known as a conventional technique. In this conventional technique, however, when an image of a series of characters (a character-series image) is inserted into an original image of character lines, an operator must input all the position coordinates and the moving destination of the character-series image to be moved, which are necessary for this correction. Therefore, burdens an the operator are very heavy. Thus, there arises a problem in that this conventional technique is not practical.

Jpn. Pat. Appln. KOKAI Publication No. 63-197266 and the like disclose a technique in this field, in which layout analysis is first performed, and then a document image is processed on the basis of results of the layer analysis.

However, the technique disclosed in the publication includes only a step of designating the position and the range of an image to be processed, and a step of moving a character at the end of a line to the head of the next line. Therefore, when a character image is incorporated into an inputted document image, appropriate arrangement cannot be attained. Thus, there remains a problem in that a document image easy to read cannot be formed.

Jpn. Pat. Appln. KOKAI Publication Nos. 3-122773, 7-85298 and the like make suggestions that layout analysis be used to process a document image. However, none of these publications disclose appropriate means for applying addition, correction or the like to a document image. Thus, addition, correction or the like cannot be applied to any document image easily or appropriately.

As described above, in the techniques that layout analysis is used to process a document image, no conventional document image processing apparatus can arrange appropriately an image to be combined with an inputted document image, or easily apply addition, correction or the like to the document image at high operating efficiency.

BRIEF SUMMARY OF THE INVENTION

An object of the present invention is to provide an apparatus and method for processing a document image wherein an image to be combined is appropriately arranged into the inputted document image on the basis of layout constituents obtained by layout analysis, so that burdens on an operator are remarkably reduced, thereby performing addition, correction or the like promptly by simple operation, and a new document image easy to read can be easily prepared.

According to a first aspect of the present invention, there is provided a document image processing apparatus comprising:

a first inputting section for inputting operator's instructions, a second inputting section for inputting a document image as image data, an analysis section for analyzing the layout of the document image on the image data so as to obtain layout constituents, an editor for specifying a position to be edited in the document image so as to edit the document image, on the basis of position/size data on the layout constituents and the operator's instructions from the first inputting section, and a displaying section for displaying the document image edited by the editor.

According to a second aspect of the present invention, there is provided a method of processing a document image, comprising the steps of:

inputting a document image as image data from a second inputting section, analyzing the layout of the document image on the basis of the image data, and obtaining layout constituents, displaying the document image on a displaying section, and specifying a position to be edited in the document image and editing the document image, on the basis of position/size data on the layout constituents and the operator's instructions from a first inputting section.

With the above-mentioned function of processing an image, burdens on an operator are remarkably reduced and a new document easy to read can be easily and promptly prepared by simple operation. That is, when an operator processes a document image to add or correct a series of characters according to the present invention, the operator can perform it by semi-automatic process on the basis of data on layout constituents obtained from layout analysis. Therefore, complicated operations that the operator must perform in the prior art can be omitted so that the burdens on the operator are reduced. Moreover, since a document image easy to read can be prepared, an operation can be performed while effectively reading the document displayed in an image form.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flowchart showing an operation of an image processing section shown in FIG. 1;

FIGS. 11A and 11B are views showing an operation on a screen in an example of a seal-embedding process;

FIGS. 12A and 12B are views showing an operation on a screen in an example of specifying an editorial area;

FIG. 13 is a view showing an operation on a screen in another example of specifying an editorial area;

FIG. 14 is a view showing an operation on a screen in still another example of specifying an editorial area;

FIG. 15 is a view showing an operation on a screen in an example of a symbol-embedding process;

FIGS. 16A to 16C are views showing an operation on a screen in another example of a symbol-embedding process and the like;

DETAILED DESCRIPTION OF THE INVENTION

The basic elements of the present invention and operation thereof will be described first with reference to FIGS. 1 to 5.

Figure 1:
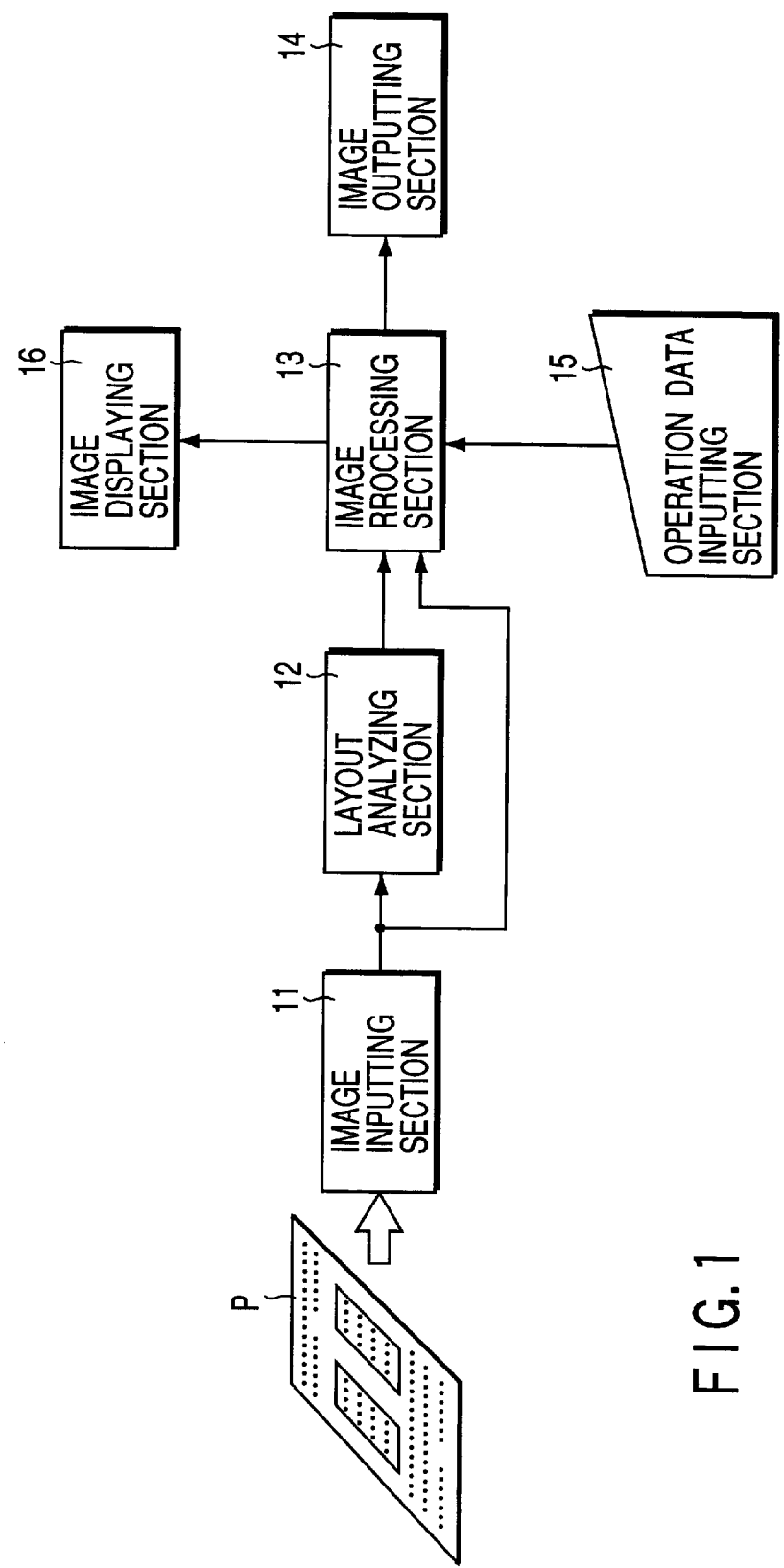
FIG. 1 is a block diagram showing the structure of a document image processing apparatus according to an embodiment of the present invention.

FIG. 1 is a block diagram showing the structure of a document image processing apparatus according to an embodiment of the present invention.

As shown in FIG. 1, an image inputting section (second inputting section) 11, which comprises a scanner or the like, is arranged to input a document image on a book or the like (P) as image data. A layout analyzing section 12 is arranged to gain layout constituents from the document image read by the image inputting section 11.

An image processing section 13 includes an editor arranged to use the layout constituents obtained from the layout analyzing section 12 to process (edit) the original image read (inputted) by the image inputting section 11, on the basis of an operator's instructions inputted from an operation data inputting section (first inputting section) 15. The image processing section 13 including the editor performs the processes shown in FIGS. 2 to 5.

An image outputting section 14 is arranged to output the document image, processed and outputted from the image processing section 13, to an external device. The operation data inputting section 15 is arranged to input various instructions made by the operator. An image displaying section 16 is arranged to display the document image, i.e., both the original image read (inputted) by the image inputting section 11, and the document image processed by the image processing section 13 (this document image including any document image during the processing), to the operator.

FIG. 2 is a flowchart showing an operation of the image processing section shown in FIG. 1.

A document image is inputted as image data from the image inputting section 11 (step S11). Next, the document image is forwarded to the layout analyzing section 12, and the layout of the document image is analyzed herein on the basis of the image data, to gain layout constituents (step S12).

The technique for analyzing a layout is an existing technique known in the document image understanding field. For example, the layout constituents include position/size data on a character, position/size data on a line, position/size data on a block (corresponding a paragraph formed of plural lines), and position/size data on an area of a photograph, a drawing, a text or the like, and on kinds thereof. The area may be further divided into finer areas so that the finer areas include classifying-data such as titles, authors' names, dates, headers and footers.

The meaning of the "position/size data" used in the above explanation is as follows. A position is related to a size. For example, the difference between the position coordinates of the left end and the right end of a rectangle is a size in the horizontal direction. Therefore, the position is not especially distinguished from the size, and these data items are called position/size data.

The document image, the layout of which has been analyzed, is displayed by the image displaying section 16 (step S13). While the operator watches the document image on the image displaying section 16, the operator performs input necessary for editing (step S14). On the basis of the input, the image processing section 13 processes any document image included in the original image, using both of the layout constituents of the layout-analyzed results and the original image (step S15). In this processing step, the image being processed is displayed to the operator by the displaying section 16.

Next, where the operation input is one for instructing the shift of the next image (the next page) (step S16), the operation procedure returns to image-inputting operation in the step S11. Where the operation input is one for instructing continuation of the processing (step S17), the operation procedure returns to the step S14 and the system waits for input necessary for editing from the operation data inputting section 15.

The document image thus processed is forwarded as a newly prepared document image to the image outputting section 14. The document image can be output to an external device.

Figure 3:
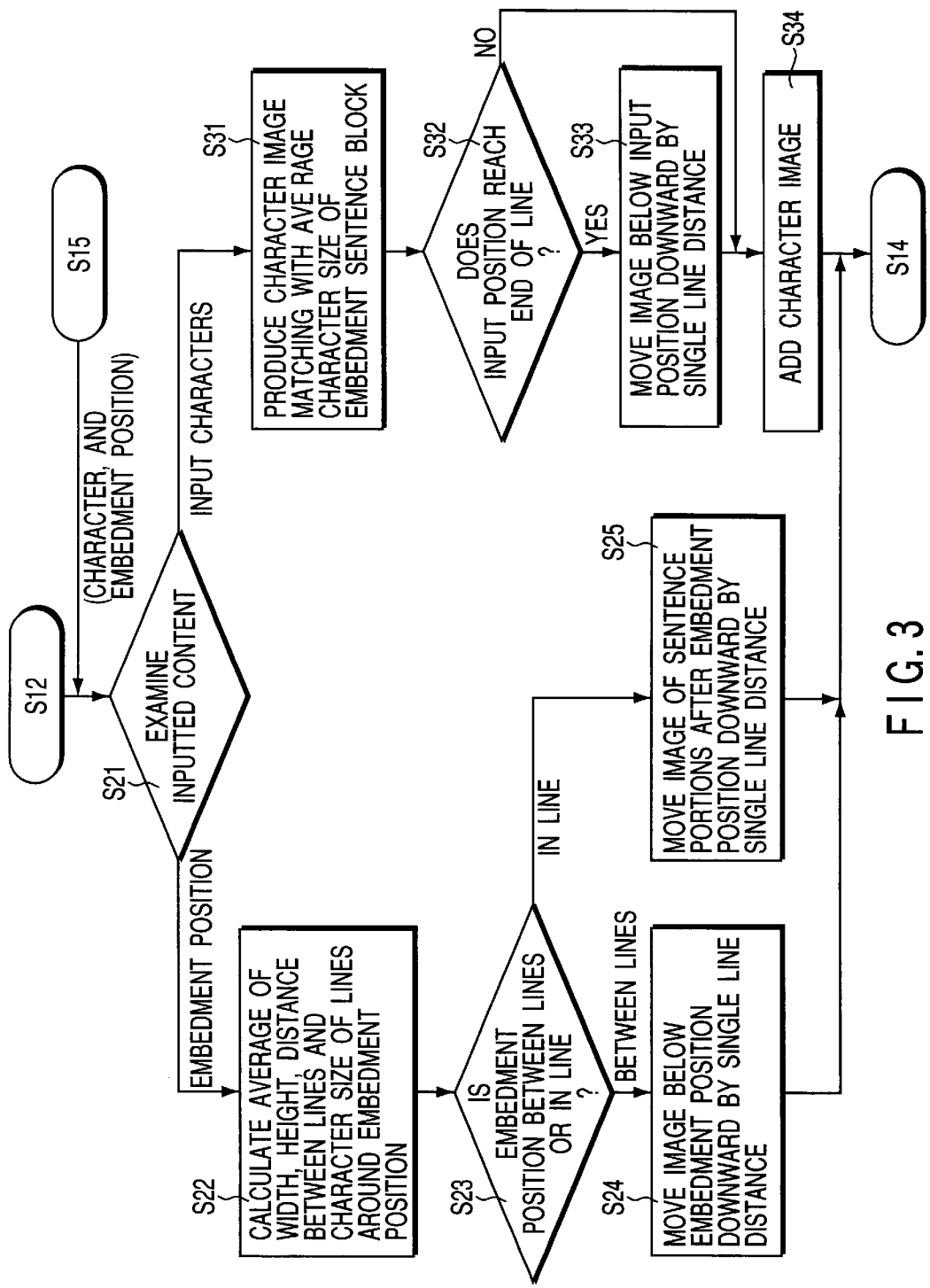
FIG. 3 is a flowchart showing a typical processing procedure in an image processing step (step S15) shown in FIG. 2.
Figure 4:
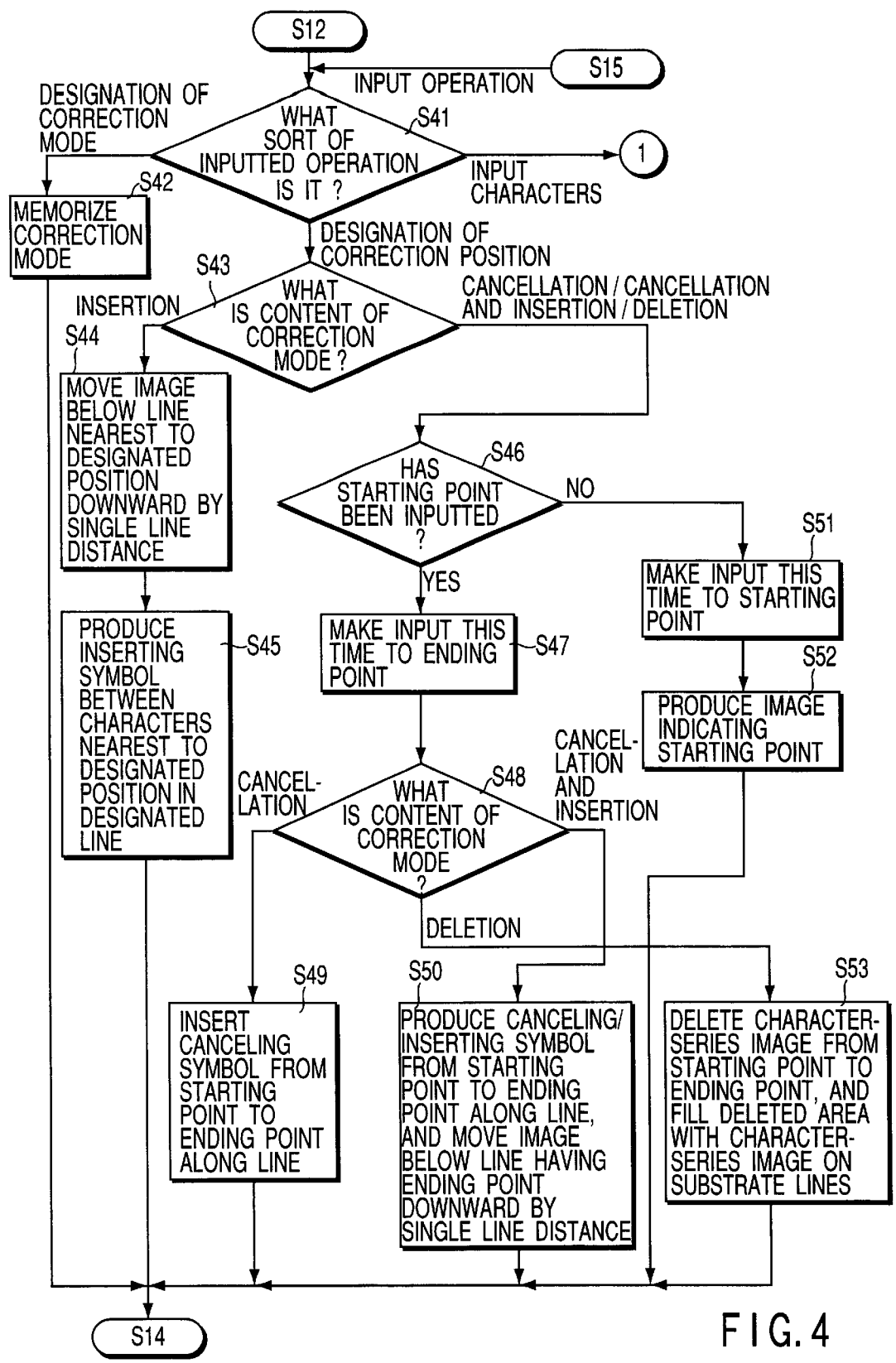
FIG. 4 is a flowchart showing another typical processing procedure in the image processing step (step S15) shown in FIG. 2.
Figure 5:
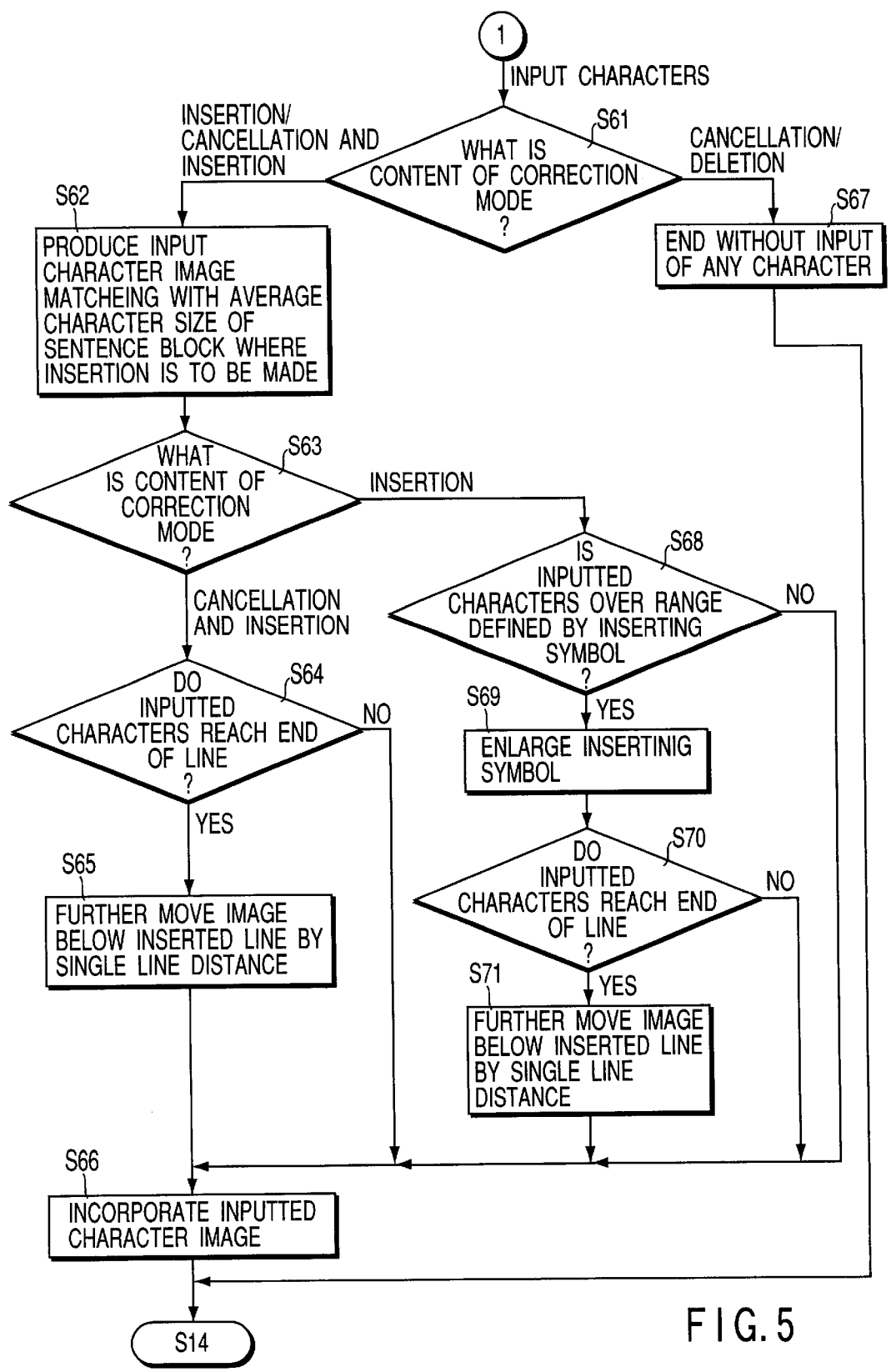
FIG. 5 is a flowchart showing another typical processing procedure in the image processing step (step S15) shown in FIG. 2.

FIGS. 3 to 5 show typical processing procedures in the image processing step (step S15) shown in FIG. 2. FIG. 3 shows a processing procedure of an embedding process (horizontal writing), and FIGS. 4 and 5 show correcting processes.

In the case of the embedding process, it is judged whether the content inputted from the operation data inputting section 15 is for designating an embedment position, or for inputting characters (step S21 in FIG. 3). If the content is for designating an embedment position, the processing in the steps S22 to 25 is performed. If the content is for inputting characters, the processing in the steps S31 to S34 is performed.

That is, if the content is for designating an embedment position, the following are obtained with reference to the layout constituents obtained from the layout analyzing section 12: the width and height of the line around the embedment position, and the distance between such lines, the average value of character sizes and the like (step S22 in FIG. 3). It is then judged whether the embedment position is between lines or in a line (step S23 in FIG. 3). If the embedment position is between lines, the document image below the embedment position is shifted by a single line distance so as to form a character image arranging area for a single line (step S24 in FIG. 3; see FIGS. 6A to 6F). If the embedment position is in a line, the document image of the sentence portion after the embedment position is shifted downward by a single line distance to form a character image arranging area for a single line (step S25 in FIG. 3; see FIGS. 7A to 7D).

If the content inputted from the operation data inputting section 15 is for inputting characters, character images to be combined are produced in accordance with the average character size of characters in a document block corresponding to the embedment position (step S31 in FIG. 3). It is then judged whether or not the position where the character images are embedded reaches the end of the line of the character image arranging area (step S32 in FIG. 3). If the position does not reach the end of the line, the produced character images are incorporated in the character image arranging area (step S34 in FIG. 3). If the input position of the character images reaches the end of the line, a character image arranging area for another single line is formed (step S33 in FIG. 3). Then, the produced character images are incorporated on the character image arranging area (step S34 in FIG. 3).

On the other hand, in the case of the correcting process, it is judged whether the content inputted from the operation data inputting section 15 is for designating a correction mode, for designating a correction position, or for inputting characters (step S41 in FIG. 4). If the content is for designating a correction mode, the processing in the step S42 is performed. If the content is for designating a correction position, the processing in the steps S43 to S53 is performed. If the content is for inputting characters, the processing in the steps S61 to S71 is performed.

That is, where content is for designating a correction mode, the designated correction mode (insertion/cancellation/cancellation and insertion/deletion) is memorized and then the processing is ended (step S42 in FIG. 4).

Where the content is for designating a correction position, the content of the correction mode designated by the correction mode designation is judged (step S43 in FIG. 4). If the content is "insertion", the document image below the line nearest to the designated position is shifted by a single line distance (step S44 in FIG. 4). An inserting symbol is produced between characters nearest to the designated position (step S45 in FIG. 4; see FIG. 17).

If the content is "cancellation/cancellation and insertion/deletion" where the correction position is designated (step S43 in FIG. 4), it is judged whether or not the starting point has been already inputted (step S46 in FIG. 4). If the position designation this time is a first position designation in this mode, the position designated this time is made to a starting position (step S51 in FIG. 4), and an image for showing the starting position is produced (step S52 in FIG. 4).

If a starting point has been already inputted (step S46 in FIG. 4), the position designated this time is made to an ending point (step S47 in FIG. 4). If the correction mode is "cancellation" or "cancellation and insertion", a canceling line symbol is inserted along the line from the starting point to the ending point (steps S48 and S49 in FIG. 4; see FIGS. 19 and 20) and then, if the mode is "cancellation and insertion", the document image below the line having the ending point is shifted downwards by a single line distance (steps S48 and S50 in FIG. 4; see FIG. 21). If the correction mode is "deletion", the character images from the starting point to the ending point are deleted and then the deleted range is filled with the character images in the subsequent lines (step S53 in FIG. 4).

Where the content inputted from the operation data inputting section 15 is character input (step S41 in FIG. 4), the content of the correction mode is judged (step S61 in FIG. 5). If the correction mode is "cancellation" or "deletion", the input characters are made void and the processing is ended (step S67 in FIG. 5).

If the correction mode is "insertion" or "cancellation and insertion" (step S61 in FIG. 5), character images to be inserted are produced in accordance with the average character size of a document block corresponding to the insertion position (step S62 in FIG. 5). When the correction mode is "cancellation and insertion" (step S63 in FIG. 5), it is judged whether or not the characters to be inserted reach the end of a line (step S64 in FIG. 5). If they do not reach the end of the line, the character images to be inserted are incorporated into the designated cancellation and insertion position (step S66 in FIG. 5). When the characters to be inserted reach the end of the line (step S64 in FIG. 5), the document image below the insertion line is shifted downward by a single line distance to expand the cancellation and insertion area (step S65 in FIG. 5). Thereafter, the character images to be inserted are incorporated (step S66 in FIG. 5).

When the correction mode is "insertion" (step S63 in FIG. 5), it is judged whether or not the characters to be inserted go over the range defined by the inserting symbol (step S68 in FIG. 5). When the characters do not go over the range defined by the inserting symbol, the character images to be inserted are incorporated (step S66 in FIG. 5).

When the characters go over the range defined by the inserting symbol, the inserting symbol is extended (step S69 in FIG. 5), the character images to be inserted are incorporated (step S66 in FIG. 5). At this time, it is judged whether or not the characters to be inserted reach the end of a line (step S70 in FIG. 5). If they do not reach the end of the line, the character images to be inserted are incorporated into the designated cancellation and insertion position (step S66 in FIG. 5). When the characters to be inserted reach the end of the line (step S70 in FIG. 5), the document image below the insertion line is shifted downward by a single line distance to expand the cancellation and insertion area (step S71 in FIG. 5). Thereafter, the character images to be inserted are incorporated (step S66 in FIG. 5).

As described above, in accordance with the operator's instructions from the operation data inputting section 15, the image processing section 13 performs image processing (step S15; FIGS. 3 to 5).

The following will describe an embedding process as a specific example of processing a document image.

First, a character-series image is prepared from an inputted series of characters (a series of character codes). The character-series image is combined with the document image inputted from the image inputting section 11 to produce a new document image. At this time, the layout constituents obtained from layout analysis by the layout analyzing section 12 are used to change the arrangement of the layout constituents such that the inputted character-series image is combined and integrated with the document image. Thus, the document image is processed. The arranging position of the character-series image or character images is decided on the basis of the position data on the layout constituents, and then the character images are combined with the document image.

In this combining treatment, the character-series image is embedded in the document image to produce an image on a single page. Alternatively, a series of character codes for representing a series of characters, an embedment position in the processed image, and data on fonts are separately prepared, and then the character-series image and the processed image before the embedment may be output as a combination thereof.

Where the operator instructs the editing operation, the layout constituents are shifted every time when a character is inputted from the keyboard of the operation data inputting section 15 or the like. The input character images and the character-series image that has been already inputted are arranged to display the resultant to the operator by the displaying section 16.

An explanation will be given to more specific examples of processing a document image according to embodiments of the present invention, with reference to FIGS. 6A to 27. The image processing in the each of the embodiments described below is performed in the image processing step (step S15) in FIG. 2 by the image processing section 13 shown in FIG. 1. Each of the processing procedures will be able to be easily understood, referring to FIGS. 3 to 5.

The image processing operation according to a first embodiment of the present invention will be firstly described with reference to FIGS. 6A to 11B, FIG. 15, FIGS. 16A to 16C, and FIG. 27.

FIGS. 6A to 6F show details of the operation on a screen in the embodiment. In FIGS. 6A to 6F, reference numbers 101 to 105 represent rectangles that indicate respective lines and are displayed on the screen, based on position/size data on lines of layout constituents obtained by layout-analyzing, through the layout analyzing section 12, a document image inputted from the image input section 11. Herein, they are merely called "lines". The indication form of these lines may be in the form of a rectangle indication (frame indication, specific color indication in each area, or the like) as illustrated, or an original image itself, a compressed or decompressed original image, or any combination thereof. In short, it is sufficient that existing positions of the lines can be known by such indication.

Figure 6A:
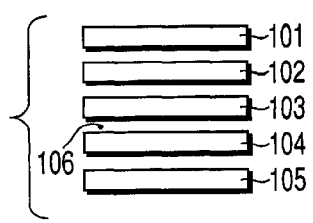
FIGS. 6A to 6F are views showing an operation on a screen in an example of a character-embedding process.

Reference number 106 in FIG. 6A represents a designated position obtained for producing an area for arranging an image, when the position where the operator will insert a series of characters is indicated by means of, e.g., a pointing device of the operation data inputting section 15. In this example, the position between the line 103 and the line 104 is designated.

Figure 6B:
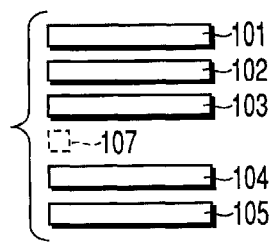

As shown in FIG. 6B, on the basis of this operation, the line 104 and the line below it (the lines 104 and 105 in FIG. 6B) are shifted downward by a line pitch. In this way, an arranging area for an image to be combined is prepared.

At this time, the line pitch, the size of characters, the font thereof, a character pitch and the like have been obtained as the layout constituents obtained through layout analysis. The line pitch included in the layout constituents is used to decide a distance to be shifted downward. The manner for moving the lines downward, that is, the manner for shifting the lines downward is realized, for example, by copying pixels of an image to be shifted, in order from the lower pixels thereof to the upper pixels thereof, into destination positions. At this time, a copy area which pixels have already been copied therefrom and which is not any copying destination, that is, the pixels present above the moved portions is changed into a blank space.

As shown in FIG. 6B, next, a cursor 107 is set into the blank space resulting from the shifting operation, so as to enter a new character in the blank space. The position of the cursor 107 is matched with the head position in the horizontal direction of the respective lines 101 to 105 (the head character position).

The head position of the respective lines of the layout constituents obtained by layout analysis is used in this way to set appropriately and automatically an embedment starting position. The arranging position in the vertical direction of the cursor is set at a position lower than the immediate upper line 103 by the line pitch, on the basis of the line pitch obtained from data on the layout constituents.

In the state that the cursor 107 is set as shown in FIG. 6B, if a series of characters are inputted by an operator through the keyboard of the operation data inputting section 15 or the like, a character-series image corresponding to the series of character codes is produced in the image processing section 13. At this time, character images corresponding to the character codes are beforehand prepared for each of fonts. The character-series image is prepared by character images corresponding to the fonts and character sizes. The fonts and the character sizes may be decided on the basis of font data on surrounding characters, which are included in the layout constituents obtained by layout analysis, or may be decided by the operator. The state that four characters are inputted by such character-input is shown by reference number 108 in FIG. 6C.

The arrangement of character images corresponding to the input character codes is as follows. When the series of characters in the document image are arranged at a constant pitch, the character arranging positions thereof can be calculated. That is, the positions can be calculated by means for estimating the character pitch from values of coordinates of a rectangle which surrounds any character, and correctly obtaining gaps between characters. This means is a well-known technique in the art of image recognition. By this technique, it is possible to obtain the arranging data of the characters, which surround an area where combining or incorporating of characters is applied. On the basis of these data, the character-arranging position in this area is decided. As a simple method, the average value of character pitches is obtained from gaps between characters in any previous line (e.g., the head position of the rectangle surrounding a character, the end position thereof, or the middle position between the rectangles of adjacent characters). This is used to decide the character-arranging position. The characters are incorporated into the decided position. The position in the above explanation means position coordinates in the horizontal direction in the case of horizontal writing, and those in the vertical direction in the case of vertical writing.

On the other hand, where the character pitch is not constant, character images are arranged on the basis of the average pitch of surrounding characters, the average length of blank spaces (gaps) between characters, and the like. As in English, where a blank space between characters and a blank space between words are different from each other, the two average lengths are respectively used. Alternatively, a predetermined pitch may be used, or the pitch decided by the operator may be used. A combination of these manners may be used. Of course, it is desired to make the display position of the cursor consistent with the position where any character is arranged.

Figure 6C:
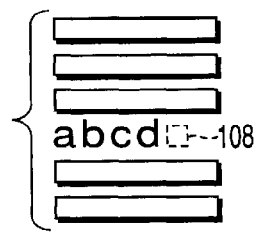
Figure 6D:
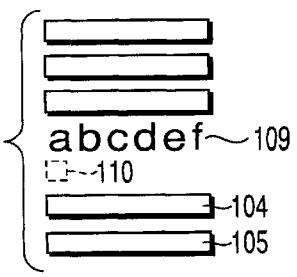

The state that characters are further input after the state shown in FIG. 6C is shown by reference number 109 in FIG. 6D. This state is a state that six characters have been input.

The final position of the character-series image (reference number 109 in FIG. 6D) prepared from the series of characters inputted so far is compared with the final position of surrounding lines of the layout constituents obtained by layout analysis. In this way, it is determined that it is necessary to start a new line in this example. This position is set to a line-changing position. In this case, the line 104 and the subsequent lines are shifted (moved) downward on the basis of the line pitch in the same way as described above. As shown in FIG. 6D, the cursor 110 is displayed at the head position in the horizontal direction of the blank area prepared by the movement. This is new-line starting display. The manner of displaying the cursor at this time is the same as described above.

Figure 6E:
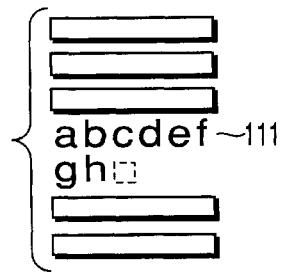
Figure 6F:
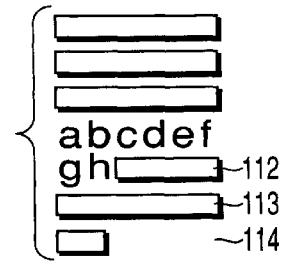

The state that characters are further input after the state shown in FIG. 6D is shown by reference number 111 in FIG. 6E.

By the operator's instructions for the end of the insertion, the insertion of the series of characters ends. As shown by reference numbers 112 to 114 in FIG. 6F, part of the lines 104 and 105 in FIG. 6D may be connected to the input series of characters 111 shown in FIG. 6E. That is, the line 104 is divided to match with the width of any line, and the left part thereof is arranged on the right side of the input character-series 111. The right side portion of the line 104 is shifted left to the position where the head of the line 104 was present. The left portion of the line 105 is connected to the left portion of the line 104 thus shifted. This is repeated to shift each of the line 104 and the subsequent lines partially. Thus, it is possible to connect the added character-series to the area between the character-series of the original document image without any unnecessary blank space.

Figure 27:
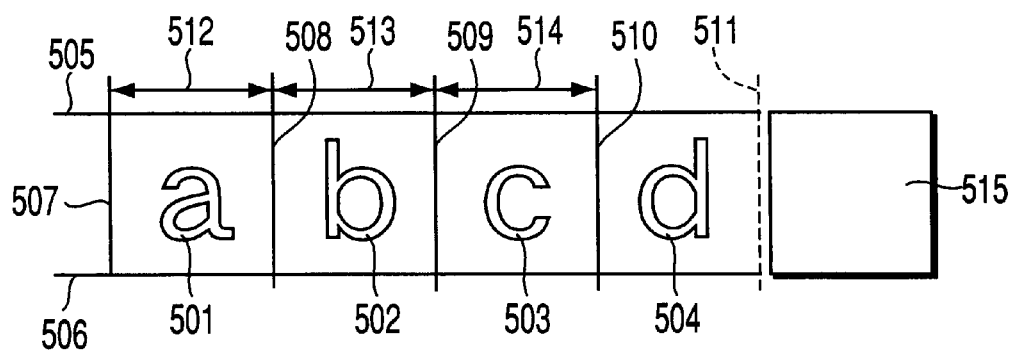
FIG. 27 is a view showing an operation on a screen in an example of embedding a character image.

FIG. 27 shows an example of embedding a character image. In FIG. 27, reference numbers 501 to 504 represent 4 characters of a part of a document image inputted as image data from the image inputting section 11. The upper end and the lower end of the character line to which the characters of this document image belong are represented by straight lines. They are represented by reference numbers 505 and 506. Reference numbers 507 to 510 and 512 to 514 represent the starting position of the respective character images and intervals of the respective characters, respectively. The average character interval or character pitch of these lines has been obtained as the layout constituents obtained by the layout analyzing section 12. The average character size and the font thereof also have been obtained.

When a character code is inputted from the keyboard of the operation data inputting section 15 or the like, a character image corresponding to the character code is produced on the basis of the character sizes, fonts, and the like. A rectangle surrounding the new character image is shown by reference number 515. The image of the rectangle 515 is incorporated such that the left end of the rectangle 515 surrounding the character image is matched with the position 511 apart from the starting position 510 of the character image 504 by the length of the average character interval and further the lower end of the rectangle 515 is matched with the position 506 of the lower end of the line. The subsequent character images are also arranged and displayed in the same way.

Figure 7A:
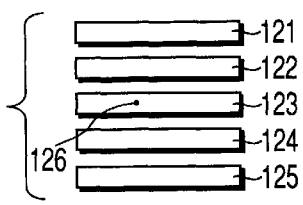
FIGS. 7A to 7D are views showing an operation on a screen in another example of a character-embedding process.

FIGS. 7A to 7D are views showing another example of image processing in the first embodiment. Reference numbers 121 to 125 represent rectangles indicating lines on a screen, in the same way as in FIGS. 6A to 6F. Reference number 126 in FIG. 7A is a designated position obtained for producing an area for arranging an image, when the position where the operator will insert a series of characters is indicated by means of, e.g., a pointing device of the operation data inputting section 15. In this example, the position in the line 123 is designated.

Figure 7B:
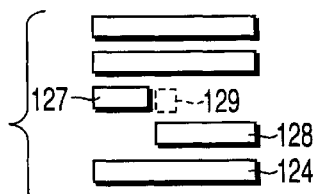
Figure 7C:
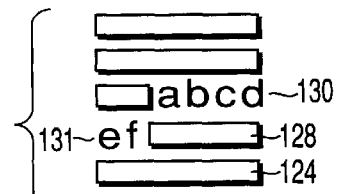
Figure 7D:
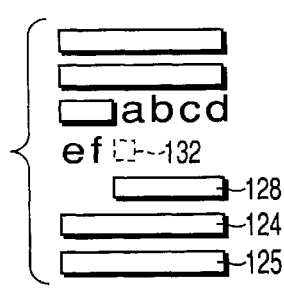

On the basis of this operation, the line 123 is divided near the designated position 126 into lines 127 and 128 by position/size data on characters of layout constituents obtained by layout analysis, as shown in FIG. 7B. A line 128 which makes a part of the line 123 is shifted downward by a single line pitch and displayed. Correspondingly to this shift, the line 124 and the subsequent lines are shifted downward and displayed. Moreover, a cursor 129 is displayed at the position following the line 127, as shown in FIG. 7B. As shown in FIG. 7C, an inputted character-series image 130 is displayed.

The final position in the horizontal direction of the character-series image prepared from the series of characters thus inputted is compared with the final position of surrounding lines of the layout constituents obtained by layout analysis. In this way, it is judged whether or not it is necessary to produce a new line. If it is necessary to produce a new line, the new-line starting is performed.

As shown by reference number 131 in FIG. 7C, an inputted series of characters are displayed from the starting position decided by comparison with the starting position of the surrounding lines. When this display of the character-series reaches the head of the line 128, the display position of the line 128, and the line 124 and the subsequent lines is further shifted downward. Then, a cursor is displayed as shown by reference number 132 in FIG. 7D so that additional characters can be inputted.

Figure 8A:
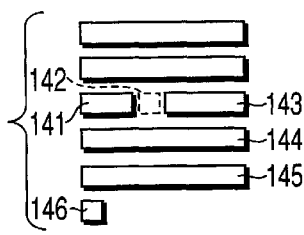
FIGS. 8A to 8C are views showing an operation on a screen in sill another example of a character-embedding process.
Figure 8B:
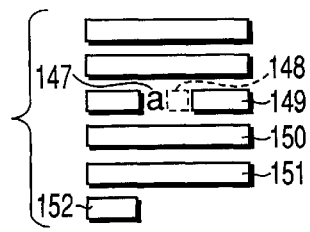
Figure 8C:
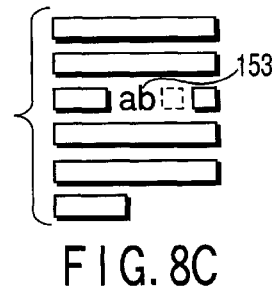

FIGS. 8A to 8C are views showing still another example of image processing in the first embodiment. Reference number 141 corresponds to the reference number 127 in FIGS. 7A to 7D. A cursor 142 corresponds to the cursor 129 in FIG. 7B. A line 143 corresponds to the line 128 in FIGS. 7A to 7D. The line 143 is not shifted downward, but is shifted right by a single character in the same way as the line 128. Following this, the right side of the line 143 is cut at the position of a gap between characters at which it is necessary to produce a new line, which is decided by comparison with the final positions of the surrounding lines. The left side of the cut line is displayed on the right side of the cursor 142.

The right side of the cut line 143 is arranged and displayed at the head of a line 144 corresponding to the line 124 in FIGS. 7A to 7D. A line 144 and subsequent lines correspond to the line 124 and subsequent lines in FIGS. 7A to 7D. The final portions of those lines are also cut in the same way as described above, and then they are arranged and displayed at the head of the line 145 and so forth. In the same way, the subsequent lines are processed and a portion 146 is formed.

If a single character is next input, its character image is displayed at the position of the cursor 142 as shown by reference number 147. The line 143 is shifted right and a cursor 148 is displayed in the resultant blank area. The line 143 is cut at a position at which it is necessary to produce a new line, which is decided by comparing the final portion of the line 143 with the final position of the surrounding lines. The left side of the cut line is arranged and displayed as a line 149 on the right side of the cursor 148. The right side of the cut line 143 is arranged and displayed at the head of a line 150 in the same way as described above. The final portion of the line 150 is arranged and displayed at the head of a line 151. In the same way, the subsequent lines are processed and a portion 152 is formed.

Reference number 153 in FIG. 8C represents a state where a character is further added from the state shown in FIG. 8B. The process is performed in the same way as described above. New-line starting processing in this image processing is performed in the same way as described with reference to FIGS. 7A to 7D.

Figure 9A:
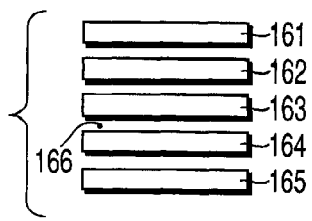
FIGS. 9A to 9D are views showing an operation on a screen in sill another example of a character-embedding process.

FIGS. 9A to 9D are views showing still another example of image processing in the first embodiment. Reference numbers 161 to 165 represent rectangles indicating lines on a screen, in the same way as in FIGS. 6A to 6F. Reference number 166 in FIG. 9A represents a position designated when the operator instructs the position where characters are to be inserted.

Figure 9B:
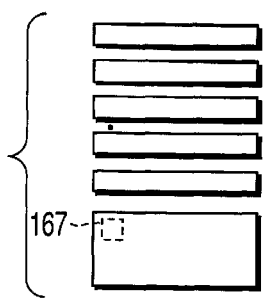
Figure 9C:
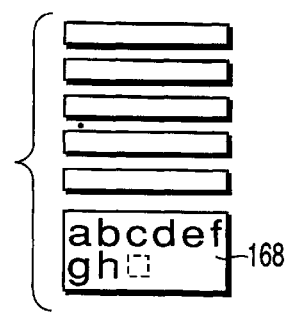
Figure 9D:
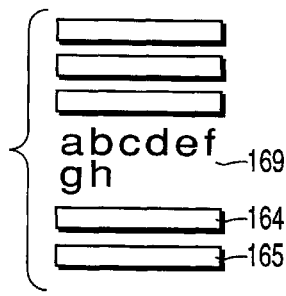

As shown in FIG. 9B, in this example of image processing, a window 167 is produced and displayed on the basis of the position-designating operation. The series of characters inputted from the keyboard of the operation data inputting section 15 or the like are displayed in this window, as shown by reference number 168 in FIG. 9C. As shown in FIG. 9D, the line 164 and the subsequent lines are shifted and displayed by instructions indicating the end of the input of the character-series. The input character-series are displayed in the resultant blank space, as shown by reference number 169. The processing for arranging character images at this time is the same as the processing described with reference to FIGS. 6A to 6F.

FIGS. 10A to 10F are views showing a different example of image processing in the first embodiment. This example is an example of a character-embedding process in a table.

Figure 10A:
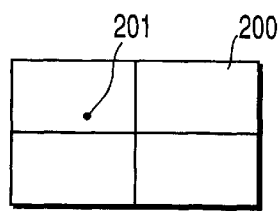
FIGS. 10A to 10F are views showing an operation on a screen in an example of a character-embedding process in a table.

An original image inputted from the image inputting section 11 (FIG. 1) is used to display a table, as shown by reference number 200 in FIG. 10A. The following processing is performed on the basis of position/size data on ruled lines among the layout constituents obtained by layout analysis, correspondingly to the ruled lines in the original image.

That is, the operator designates a column on a screen where an entry is to be made, for example, a column shown by reference number 201. As a result, the position/size data on ruled lines included in the layout constituents obtained by layout analysis are used to specify and decide a column to be processed. In this example, a designated column 201 is decided as an entry area.

Figure 10B:
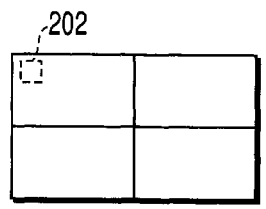
Figure 10C:
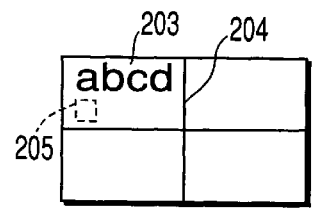
Figure 10D:
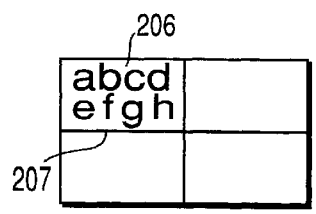

As shown in FIG. 10B, after the decision, a cursor 202 is displayed at a left-shifted, center-shifted, right-shifted position or the like in the column. In the example shown in FIG. 10B, the cursor 202 is displayed at the left-shifted position. In this state, a series of characters inputted from the keyboard of the operation data inputting section 15 or the like are displayed. In the example shown in FIG. 10C, a character-series 203 composed of four characters is inputted and displayed. In this example, by adding the four characters the display position reaches a ruled line 204 that is a limit of the entry area. As shown in FIG. 10C, therefore, the cursor showing the position for inputting any next character is shifted at a position 205 of the lower left of the character-series 203. Additional character-series are inputted to display, for example, eight characters, as shown by reference number 206 in FIG. 10D. In this case, the display position reaches in the vertical direction down to a ruled line 207 that is a limit of the entry area. Thus, a control is made such that any additional character-series is not input. Of course, at this time a control may be made such that an imaginary boundary is set below a column 206 and it is lowered in accordance with inputted character-series to continue the character input.

Figure 10E:
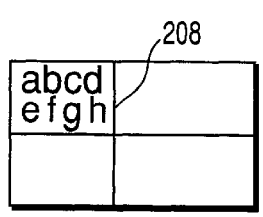
Figure 10F:
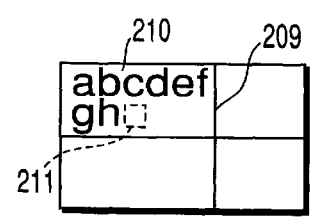

The following will describe a process of moving a ruled line 208 in FIG. 10E automatically or by the operator's instructions. The ruled line 208 is erased by causing the value of pixels of a given position (i.e., the position where it can be decided from the data on the layout constituents that the ruled line 208 is present) to be the same as the value of pixels of the background. By generating a ruled line image at a position 209 in FIG. 10F, the ruled line 208 is displayed to be shifted right in appearance. Following this shift of the ruled line 208, the character-series image 206 is also arranged to be matched with the newly set entry area, and is displayed as shown by reference number 210 in FIG. 10F. In this example, the two characters of the head portion in the second line are shifted after the first line, and then the second line is shifted left. When an additional character-series is inputted in this state, the character-input continues from the position of the cursor 211.

The above explanation relates to the vertical ruled line. For any horizontal ruled line, the same moving process is performed. At that time, in the display of character-series image following the shift of the ruled line, a blank space may be produced, correspondingly to the movement of the ruled line. The character-series image may be moved such that the image is positioned at the center of the columns whose height has been changed. If plural lines are in columns, the distance between lines may be changed to arrange series of characters uniformly in the columns.

FIGS. 11A and 11B are views showing a different example of image processing in the first embodiment. Reference number 220 represents an inputted image as a table form. Areas of respective columns are specified by layout-analyzing this image in a table form and obtaining the position/size data on ruled lines as layout constituents. Next, the operator designates a column where a seal-embedding process is electrically performed, for example, at a position 221 by means of a pointer device of the operation data inputting section 15 or the like. Following this, the area including the position 221 is decided as a seal-addition area on the basis of the position/size data on ruled lines. Next, the image of the seal or stamp is incorporated into the center of the area by designating the sort of the seal or stamp to be put.

In this example, the incorporating position is set to the center of the area, but may be set to any position other than the center. Not only the seal or stamp but also any image may be used. In the examples shown in FIGS. 11A and 11B, character-series in the columns 223 to 225 may be recognized and then a seal-addition column may be automatically specified by the character-series. The seal or stamp may be embedded by a so-called "seal mechanically-stamping function", that is, a function of incorporating images that have the same seal-shape automatically into a specified area of each book.

FIG. 15 is a view showing a different example of image processing in the first embodiment. In this example, the position/size data of item characters 300 to 302 have been obtained as layout constituents. On the basis of these data, the vicinity of the character to be marked is indicated with the pointing device of the operation data inputting section 15 or the like. Thereupon, a figure or symbol which surrounds the item character (a circle 303 in the example shown in FIG. 15) is embedded to the inputted image, referring to the position/size data on the corresponding character, such that the character is positioned at the center of the circle. Thus, a marked image is prepared.

In FIG. 16A, reference number 320 represents an example of a document image of an entering form. In FIG. 16B, reference number 321 represents a document image to which a character-series, a circle mark, and a seal are embedded. This image or the following image may be output. That is, as shown in FIG. 16C, the character-series, circle mark, and seal images are separately prepared as embedment data, such as character codes, symbols, image data on the seal, embedment positions, fonts, character image data and symbol image data. The embedment data and the document image 320 are output as a group. At this time, the document data 320 may be output not as image data but as code data which represent the sort of the book.

The following will describe image processing according to a second embodiment of the present invention, referring to FIGS. 12A to 14.

In the example shown in FIGS. 12A and 12B, item characters 241 to 244 are described at the upper left in some columns in a table 241. Referring to data on layout constituents obtained from layout-analysis, an entry area, that is, an area where an image is to be incorporated, is specified such that the area does not include the item characters. In the example shown in FIG. 12B, a hatched area 245 is displayed as the entry area. That is, the area 245 is displayed in a form different from the form of the surroundings. In this example, the three columns before a column including the next item character "B" are specified as the entry area.

In actual display, this hatched area is displayed such that this area can easily be recognized by the operator, by a method of changing its color or concentration, or adding a pattern as shown by hatching lines in FIG. 12B. This display may be performed by adding a frame surrounding this area or by adding an underline, as well as the change in the color of the whole area. Based on the operator's instructions, the image to be combined is incorporated into this entry area to produce a new document image.

FIG. 13 shows an example wherein an entry column 260 has, at its center, a symbol "~" shown by reference number 261. In this example, the entry column 260 is divided into areas 262 and 263 on the basis of the position/size data on the symbol 261 extracted as a character-series. The area 262 is displayed as an entry area by changing its color in the same way as in the example shown in FIG. 12. After the entry into the area 262 is completed, the area 263 is displayed by changing its color in the same way.

FIG. 14 shows an example where entry areas do not include any ruled line. In this example, character-series 280 to 284 have been obtained as item names. Entry areas are set before, after and between the item names, and are displayed by changing their colors in the same way as in FIG. 12. In this example, characters of "D (date)", "M (month)" and "Y (year)" are obtained as results of character recognition. When it is checked that they are arranged to sandwich spaces and further their forms are verified, portions 285 to 287 between them are set as entry areas. On the other hand, about the item names 283 and 284, the key words "ADDRESS" and "NAME" are checked by using character recognition results. On the basis of the results, the blank areas connected to the side of respective character-series are set and displayed as entry areas 289 and 290. At this time, it is allowable to decide the length of the entry area for each of the key words and set a display area on the basis thereon.

The following will describe image processing according to a third embodiment of the present invention, referring to FIGS. 17A to 26. First, a correction-inserting process is explained.

Figure 17A:
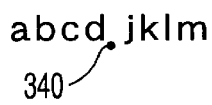
FIGS. 17A to 17E are views showing an operation on a screen in an example of a correction-inserting process.
Figure 17B:
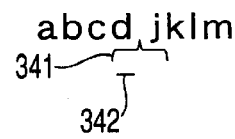
Figure 17C:
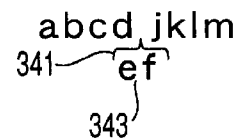
Figure 17D:
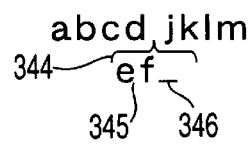
Figure 17E:

FIGS. 17A to 17E show an example of a character-series image of a document image. Where the operator instructs that a new series of characters is inserted into a position 340 in FIG. 17A on this display screen, the operation thereof will be described below. As shown in FIG. 17B, an inserting symbol 341 is produced and displayed in a designated position 340. Accompanying the inserting symbol 341, a cursor 342 for inputting a character-series is displayed. A character-series inputted from the keyboard of the operation data inputting section 15 or the like is converted to character images, so as to display them on a position 343 in FIG. 17C. This case is an example in which two characters are inserted. Since the area in the inserting symbol is filled with the character-series image of the two inserted characters, the inserting symbol is next enlarged. The enlarged inserting symbol is shown by reference number 344 in FIG. 17D. This inserting symbol 344 is displayed instead of the previous inserting symbol 341. Following this, the character-series image 343 is also shifted to a display position 345 and subsequently a cursor 346 is displayed. Thereafter, additionally inputted characters are converted to character images. The character images are displayed as shown by reference number 347 in FIG. 17E.

Figure 18A:
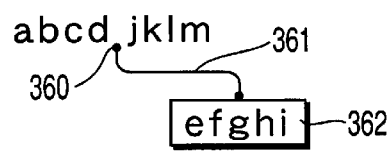
FIGS. 18A and 18B are views showing an operation on a screen in another example of a correction-inserting process.
Figure 18B:
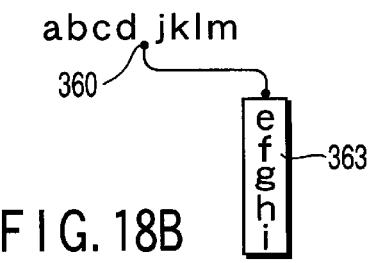

FIGS. 18A and 18B show another inserting symbol. In FIG. 18A, reference numbers 360, 361 and 362 represent an inserting position 360, a drawing line 361 and an inserted character-series image 362, respectively. In FIG. 18B, reference number 363 represents an inserted character-series image as an example of vertical writing. The inserted character-series images 362 and 363 are displayed in blank spaces. The drawing line may be operated by the operator. Alternatively, when the operator designates an insertion position and a position for placing inserted characters, the drawing line may be automatically prepared to connect them to each other. At this time, the image of the drawing line is arranged and incorporated, on the basis of position/size data on layout constituents, such that it does not disturb reading of the layout constituents. The inserted character-series is enclosed within a frame in FIGS. 18A and 18B. However, no frame may be used. The inserted character-series may be arranged in the vertical or horizontal direction in accordance with the state of the blank space around it. That is, if the blank space is vertically longer, the inserted character-series may be automatically set to a vertical writing form, and if horizontally longer, the inserted character-series may be automatically set to a horizontal writing form.

Figure 19:
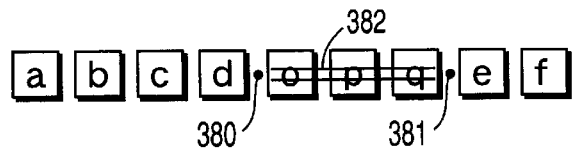
FIG. 19 is a view showing an operation on a screen in an example of a canceling process (a canceling-symbol-inserting process)

FIG. 19 shows an example of producing a canceling line symbol. In this example, a part of a character-series image of an inputted document image and position/size data on characters obtained by layout-analyzing the inputted image are displayed in an overlap form as frames. The frames are not necessarily displayed. Where the operator instructs a cancellation starting position 380 and a cancellation ending position 381 for this display image, the operation thereof will be described below. The positions of gaps of characters near the starting position 380 and the ending position 381 are decided from data on the layout constituents. On the basis of this decision, a canceling line symbol 382 is produced and is displayed to overlap with the character-series image of an original image. In this example, the canceling line symbol is a double line, but may be any line.

Figure 20:
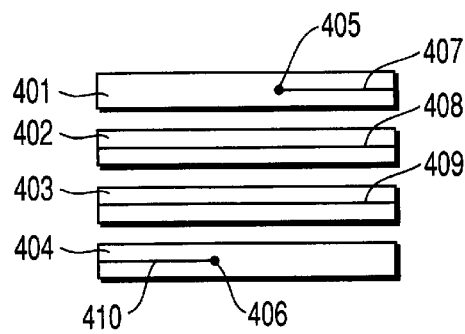
FIG. 20 is a view showing an operation on a screen in another example of a canceling process.

FIG. 20 also shows an example of producing a canceling line symbol. In FIG. 20, reference numbers 401 to 404 represent rectangles representing lines on a screen. Reference numbers 405 and 406 represent a starting position and an ending position, respectively, designated by the operator who intends to cancel a character-series. The positions of gaps of characters near the designated starting position 405 and the ending position 406 are decided from data on the layout constituents. On the basis of this decision, canceling line symbols 407 to 410 are produced and are displayed to overlap with the character-series image of an original image.

It is known from results of layout analysis that the reading order of the respective lines is the order of 401, 402, 403 and 404. Therefore, the canceling line symbols are prepared in this order. That is, for the line 401 including the starting position 405, the canceling line symbol 407 is prepared and displayed from the starting position to the end of the line. For the line 404 including the ending position 406, the canceling line symbol is prepared and displayed from the head of the line to the ending position 406. For the lines 402 and 403 between the lines 401 and 404, canceling line symbols 408 and 409 are prepared and displayed on the whole of the lines 402 and 403. In this way, the image including at least the image of the canceling line symbol (correcting symbol) extending over the plural lines is incorporated on the basis of the reading order of the layout constituents, to produce a new document image.

Figure 26:
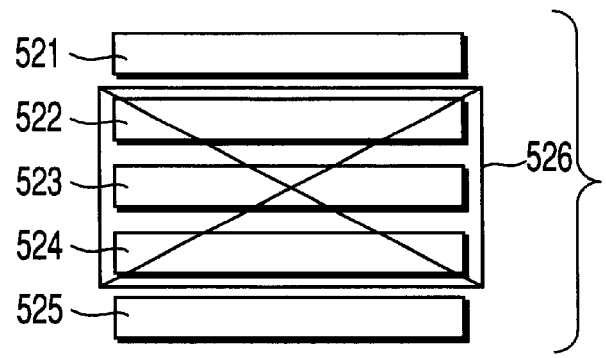
FIG. 26 is a view showing an operation on a screen in still another example of a canceling process.

FIG. 26 shows still another example of cancellation. In FIG. 26, reference numbers 521 to 525 represent rectangles representing lines on a screen. When the operator designates lines 522 to 524 as lines to be cancelled, a rectangle having "X"-shaped crossed lines is prepared as a canceling symbol and displayed on an area 526 surrounding the lines 522 to 524.

By the operator's designation of a block including plural lines or a block including a figure, a photograph or the like, which is obtained from layout constituents as results of layout analysis, such a canceling symbol 526 may be prepared and displayed to overlap with the block.

Figure 21:
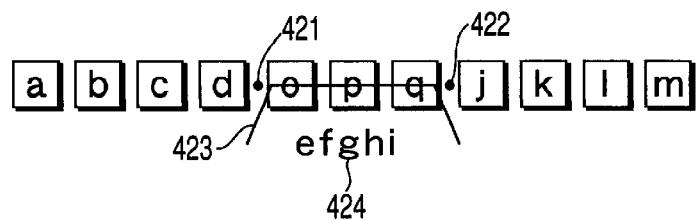
FIG. 21 is a view showing an operation on a screen in an example of a canceling and inserting process.

FIG. 21 shows an embodiment in which cancellation and insertion are combined. By designating a cancellation starting position 421 and a cancellation ending position 422, a canceling/inserting symbol 423 is prepared and displayed between the starting position 421 and the ending position 422 in the same way as in the embodiment shown in FIG. 19. In the same way as in the embodiment shown in FIGS. 17A to 17E, an image 424 of a correction character-series is arranged and displayed beneath the canceling/inserting symbol.

Figure 22:
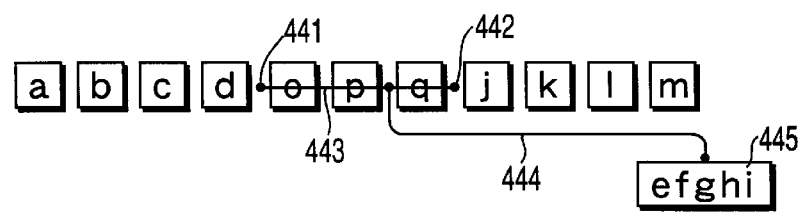
FIG. 22 is a view showing an operation on a screen in another example of a canceling and inserting process.

FIG. 22 also shows an embodiment in which cancellation and insertion are combined. By designating a cancellation starting position 441 and a cancellation ending position 422 in this example, a canceling line symbol 443 is prepared and displayed between the positions 441 and 422 in the same way as in the embodiment shown in FIG. 19. In the same way as in the embodiment shown in FIG. 18A, an image 445 of a correction character-series is arranged and displayed as an inserting character-series image at a position as illustrated. A drawing line 444 is arranged and displayed between the image 445 and the canceling line symbol 443.

Figure 23A:
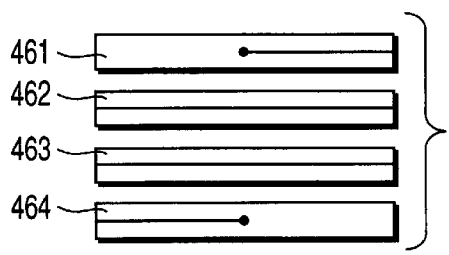
FIGS. 23A and 23B are views showing an operation on a screen in still another example of a canceling and inserting process.
Figure 23B:
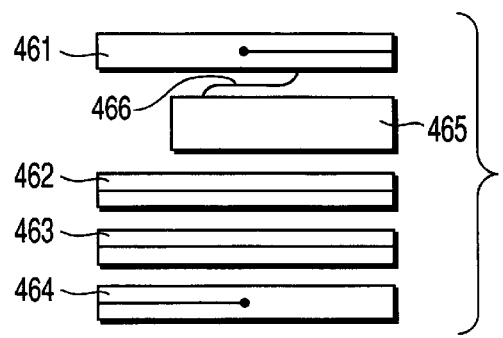

FIGS. 23A and 23B show an example of cancellation and insertion extending over plural lines. In FIGS. 23A and 23B, reference numbers 461 to 464 represent rectangles representing lines on a screen. Canceling line symbols are prepared in the same way as in the embodiment shown in FIG. 20 and displayed on the rectangles. Next, a character-series to be arranged instead of the cancelled portion is inputted. As shown in FIG. 23B, the image of the character-series is displayed in a correction character-series display area 465 made between lines 461 and 462. In order to make this display area 465, each of the line 462 and the subsequent lines is shifted by a single line distance and displayed. Reference number 466 represents a drawing line connecting the display area 465 to the canceling line symbol.

Figure 24:
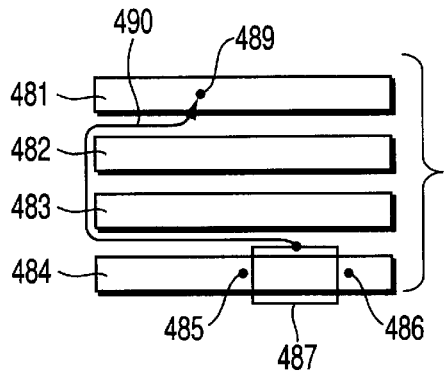
FIG. 24 is a view showing an operation on a screen in an example of a moving process.
Figure 25:
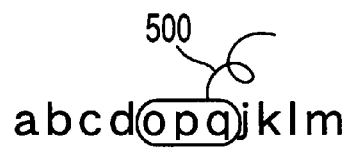
FIG. 25 is a view showing an operation on a screen in still another example of a canceling process.

FIG. 24 shows an example in which a part of a character-series is moved. In FIG. 24, reference numbers 481 to 484 represent rectangles representing lines on a screen. Reference number 485 and 486 represent a starting point and an ending point of the portion to be moved, respectively. On the basis of the instructions, an image for setting the portion to be moved is prepared and displayed. In the example shown in FIG. 24, a frame surrounding the character-series is displayed. However, the color or concentration of the portion may be changed and displayed. An underline may be added. If the operator instructs the position of a moving destination as a position 489, a drawing lines 490 is prepared to connect the portion 487 to be moved to the moving destination 487 on the basis of the instructions.

In these examples, the canceling line symbol is a single line or a double line, but may be any line. A canceling symbol is allowable instead of any canceling line symbol. An example of this canceling symbol is shown by reference number 500 in FIG. 25.

The following will describe an example in which the character-series images of specific characters are collectively converted to another character-series images. A character-series to be replaced is first input, and this is compared with character-series reading result obtained by character-recognizing an inputted document image to find the subject character-series. The character-series image corresponding to the character-series found in this way is erased. Next, a character-series image produced from an inputted character-series that is used for replacement is arranged and incorporated into the area where the erasion has been performed. If the size of this area does not match with the character-series used for replacement at this time, the surrounding character-series image is shifted by the size of characters that do not match. The position data on the gap between characters is used to rearrange and display the surrounding character-series image. Such processing is applied to the entire document so that the specific character-series images can be collectively converted.

The above-mentioned processing can be performed among images. That is, an image to be replaced, which is not necessarily any character-series image, is taken out from an inputted document or any source. This image is compared with a part of the document image. The image of the consistent part is erased. Then, as described above, an image to be used for replacement, which is also taken out from the inputted document or any source, is incorporated into this part. In this way, specific images can be collectively converted. Where the image to be replaced is a character image, the comparing position in the inputted document image can be defined by the positions of gaps of characters obtained from layout analysis. In this case, the image which matches with the image to be replaced can be effectively searched.

The replaced image may be embedded into a position designated in an inputted original image and finally outputted, in accordance with a process the same as in producing and displaying the inserting symbol, the canceling line symbol, the canceling symbol, the character-series image described above. In the present invention, all symbols as described above are generically called "correction symbols".

According to the embodiments of the present invention, where the operator processes a document image to add or correct a character-series, semi-automatically processing is supplied to the operator on the basis of data on layout constituents obtain from layout analysis. Therefore, it is possible to omit complicated operation that must be performed by the operator in the prior art. Thus, burdens on the operator can be highly reduced. A document image easy to watch can be produced so that the document displayed in an image form can be effectively read.

It is possible to display various symbols, the inserting symbol, the deleting symbol, the canceling line symbol, the frame, the rectangle, the character-series image to be deleted or inserted, the deletion or insertion position, the character-series image to be inserted, and the like so as to be distinguished from others, for example, by changing their color or concentration, or adding an underline or a frame. The above description of the present invention is made about processes of correcting a main text by an additional character-series. However, the present invention is not limited thereto. For example, an additional character-series, an additional symbol, or an additional image may be added as a comment on a text. In the present invention, examples of a character-series include a single character. Furthermore, the present invention may be applied to other processes, such as a process of transferring a newly produced image to the outside through a communication means, a process of printing, a process of storing images in an image storing device, and the like. The above description has been made mainly about a horizontally-writing document. The present invention can be however applied to a vertically-writing document.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document image processing apparatus, comprising:
    a first inputting section for inputting operator instructions;
    a second inputting section for inputting a document image as image data;
    an analysis section for analyzing a layout of the document image on the image data so as to obtain layout constituents;
    an editor for specifying a position to be edited in the document image so as to edit the document image, on the basis of position/size data corresponding to the layout constituents and the operator instructions from the first inputting section, the editor comprising an additional-image producer for producing an additional image to be combined with the document image in accordance with the operator instructions; and
    a displaying section for displaying the document image edited by the editor,
    wherein the additional-image producer comprises means for producing an additional character-series image from a series of character codes as the additional image, and
    the additional-image producer comprises means for producing, as the additional image, a correction symbol image that indicates a correction position of the document image and that is to be combined with the additional character-series image, the correction symbol image being an image selected from the group consisting of a canceling line symbol image, an inserting symbol image, and a drawing line image.

2. The apparatus of claim 1, wherein the additional-image producer comprises means for changing the size of the correction symbol image in correlation with the additional character-series image.

3. A document image processing apparatus, comprising:
    a first inputting section for inputting operator instructions;
    a second inputting section for inputting a document image as image data;
    an analysis section for analyzing a layout of the document image on the image data so as to obtain layout constituents;
    an editor for specifying a position to be edited in the document image so as to edit the document image, on the basis of position/size data corresponding to the layout constituents and the operator instructions from the first inputting section, the editor comprising an additional-image producer for producing an additional image to be combined with the document image in accordance with the operator instructions; and
    a displaying section for displaying the document image edited by the editor,
    wherein the additional-image producer comprises means for producing a canceling line symbol image whose starting and ending points are defined so that they match with gap positions of characters in the document image.

4. The apparatus of claim 3, wherein the means for producing the canceling line symbol image determines a line-changing position of the canceling line symbol image to be arranged over a plurality of lines in the document image on the basis of position/size data on lines obtained as the layout constituents.

5. A method for processing a document image, comprising:
    inputting a document image as image data from a second inputting section;
    analyzing a layout of the document image on the basis of image data, and obtaining layout constituents;
    displaying the document image;
    specifying a position to be edited in the document image and editing the document image, on the basis of position/size data corresponding to the layout constituents and operator instructions from a first inputting section;

producing an additional image to be combined with the document image in accordance with the operator instructions;

producing an additional character-series image from a series of character codes as the additional image; and producing, as the additional image, a correction symbol image that indicates a correction position of the document image and that is to be combined with the additional character-series image, the correction symbol image being an image selected from the group consisting of a canceling line symbol image, an inserting symbol image, and a drawing line image.

6. The method of claim 5, comprising:

changing a size of the correction symbol image in correlation with the additional character-series image.

7. A method for processing a document image, comprising:

inputting a document image as image data from a second inputting section;

analyzing a layout of the document image on the basis of image data, and obtaining layout constituents;

displaying the document image;

specifying a position to be edited in the document image and editing the document image, on the basis of position/size data corresponding to the layout constituents and operator instructions from a first inputting section;

producing an additional image to be combined with the document image in accordance with the operator instructions; and producing a canceling line symbol image whose starting and ending points are defined so that they match with gap positions of characters in the document image.

8. A document image processing apparatus, comprising:

a first inputting section for inputting operator instructions;

a second inputting section for inputting a document image as image data;

an analysis section for analyzing a layout of the document image on the image data so as to obtain layout constituents;

an editor for specifying a position to be edited in the document image so as to edit the document image, on the basis of position/size data corresponding to the layout constituents and the operator instructions from the first inputting section, the editor comprising an additional-image producer for producing an additional image to be combined with the document image in accordance with the operator instructions; and a displaying section for displaying the document image edited by the editor, wherein the additional-image producer comprises means for producing an additional character-series image from a series of character codes as the additional image.

9. The apparatus of claim 8, wherein the additional-image producer comprises means for determining a line-changing position of the additional character-series image to be arranged inside the document image, on the basis of the position/size data corresponding to the layout constituents.

10. The apparatus of claim 8, wherein the editor comprises means for moving at least a portion of a subject line image on the basis of position/size data on lines obtained as the layout constituents, to produce an arranging area for arranging the additional character-series image, and displaying a cursor in the arranging area to wait for character-series codes of the additional character-series image.

11. The apparatus of claim 10, wherein the arranging area is produced either when the additional character-series image is combined with the document image or when a line-changing position of the additional character-series image to be arranged inside the document image is decided.

12. A document image processing apparatus, comprising:

a first inputting section for inputting operator instructions;

a second inputting section for inputting a document image as image data;

an analysis section for analyzing a layout of the document image on the image data so as to obtain layout constituents;

an editor for specifying a position to be edited in the document image so as to edit the document image, on the basis of position/size data corresponding to the layout constituents and the operator instructions from the first inputting section, the editor comprising an additional-image producer for producing an additional image to be combined with the document image in accordance with the operator instructions; and a displaying section for displaying the document image edited by the editor, wherein the editor comprises means for causing the displaying section to display an area to be edited in the document image in a display form different from a surrounding display form.

13. A method for processing a document image, comprising:

inputting a document image as image data from a second inputting section;

analyzing a layout of the document image on the basis of image data, and obtaining layout constituents;

displaying the document image;

specifying a position to be edited in the document image and editing the document image, on the basis of position/size data corresponding to the layout constituents and operator instructions from a first inputting section;

producing an additional image to be combined with the document image in accordance with the operator instructions; and producing an additional character-series image from a series of character codes as the additional image.

14. The method of claim 13, comprising:

determining a line-changing position of the additional character-series image to be arranged inside the document image, on the basis of the position/size data corresponding to the layout constituents.

15. A method for processing a document image, comprising:

inputting a document image as image data from a second inputting section;

analyzing a layout of the document image on the basis of image data, and obtaining layout constituents;

displaying the document image;

specifying a position to be edited in the document image and editing the document image, on the basis of position/size data corresponding to the layout constituents and operator instructions from a first inputting section;

producing an additional image to be combined with the document image in accordance with the operator instructions; and displaying an area to be edited in the document image in a display form different from a surrounding display form.

* * * * *